United States Patent
Autran et al.

(10) Patent No.: US 9,102,237 B2
(45) Date of Patent: Aug. 11, 2015

(54) HUMAN-MACHINE INTERFACE FOR A MOTOR VEHICLE AND METHOD FOR ASSEMBLING THE SAME

(75) Inventors: Frédéric Autran, Paris (FR); Ziad El Khoury, Antony (FR); Jean-David Lafferayrie, Creteil (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 386 days.

(21) Appl. No.: 13/383,440

(22) PCT Filed: Jul. 7, 2010

(86) PCT No.: PCT/FR2010/000497
§ 371 (c)(1),
(2), (4) Date: Apr. 11, 2012

(87) PCT Pub. No.: WO2011/010009
PCT Pub. Date: Jan. 27, 2011

(65) Prior Publication Data
US 2012/0188186 A1 Jul. 26, 2012

(30) Foreign Application Priority Data
Jul. 21, 2009 (FR) .................................... 09 55086

(51) Int. Cl.
*G06F 3/041* (2006.01)
*B60K 37/04* (2006.01)
(52) U.S. Cl.
CPC .............. *B60K 37/04* (2013.01); *G06F 3/0416* (2013.01); *Y10T 29/49826* (2015.01)

(58) Field of Classification Search
CPC ..... G06F 3/041; G06F 3/0412; G06F 3/0416; G06F 3/04886; H05K 7/00; B60Q 1/00; B60Q 1/50; B60K 35/00; B60K 37/04
USPC ............. 345/156, 164, 173, 184; 361/679.01; 340/438, 461
See application file for complete search history.

(56) References Cited

U.S. PATENT DOCUMENTS

| 4,312,577 A | * | 1/1982 | Fitzgerald | ........................ 353/12 |
| 5,552,989 A | * | 9/1996 | Bertrand | ........................ 701/516 |

(Continued)

FOREIGN PATENT DOCUMENTS

| EP | 0889304 A1 | 1/1999 |
| GB | 2416338 A | 1/2006 |

(Continued)

OTHER PUBLICATIONS

International Search Report issued in PCT/FR2010/000497, mailed on Oct. 5, 2010, with translation, 6 pages.

(Continued)

*Primary Examiner* — Joe H Cheng
(74) *Attorney, Agent, or Firm* — Osha Liang LLP

(57) ABSTRACT

The present invention relates to a human-machine interface (30, 60), including a multifunctional screen (32) arranged in a housing (34) to be housed in the dashboard of a vehicle, said housing (34) having an opening (36) corresponding to an outline (38) of the screen in order to enable a user to view the information displayed on said screen (32), characterized in that the screen (32) and the housing (34) are covered by a common surface (40) forming a single front panel for the screen (32) and the housing (34).

10 Claims, 2 Drawing Sheets

(56) References Cited

U.S. PATENT DOCUMENTS

| | | | |
|---|---|---|---|
| 6,563,492 B1 * | 5/2003 | Furuya | 345/178 |
| 8,446,381 B2 * | 5/2013 | Molard et al. | 345/173 |
| 8,515,617 B2 * | 8/2013 | Wille et al. | 701/33.4 |
| 8,548,547 B2 * | 10/2013 | Vij | 600/323 |
| 2001/0020202 A1 * | 9/2001 | Obradovich et al. | 701/1 |
| 2001/0050671 A1 * | 12/2001 | Ogawa et al. | 345/156 |
| 2002/0149495 A1 * | 10/2002 | Schach et al. | 340/815.78 |
| 2003/0023353 A1 * | 1/2003 | Badarneh | 701/1 |
| 2005/0168330 A1 | 8/2005 | Ono et al. | |
| 2006/0022910 A1 * | 2/2006 | Sekiya et al. | 345/76 |
| 2006/0181399 A1 | 8/2006 | Sumiya | |
| 2007/0120693 A1 * | 5/2007 | Vij | 340/632 |
| 2007/0126698 A1 * | 6/2007 | Iwamoto et al. | 345/156 |
| 2008/0211779 A1 * | 9/2008 | Pryor | 345/173 |
| 2009/0167188 A1 * | 7/2009 | Mueller et al. | 315/82 |
| 2009/0174682 A1 | 7/2009 | Bowden et al. | |
| 2010/0214238 A1 * | 8/2010 | Christoph et al. | 345/173 |
| 2011/0140873 A1 * | 6/2011 | Stahlin et al. | 340/438 |
| 2011/0227718 A1 * | 9/2011 | Waller et al. | 340/461 |
| 2012/0109452 A1 * | 5/2012 | Autran et al. | 701/36 |
| 2012/0235932 A1 * | 9/2012 | Autran et al. | 345/173 |

FOREIGN PATENT DOCUMENTS

| | | |
|---|---|---|
| JP | H04-11579 U | 1/1992 |
| JP | H10-170331 A | 6/1998 |
| JP | 2001-105986 A | 4/2001 |
| JP | 2006-133415 A | 5/2006 |
| JP | 2006-214757 A | 8/2006 |

OTHER PUBLICATIONS

Office Action issued in corresponding Japanese Application No. 2012-521063, mailed Apr. 22, 2014 (10 pages).

* cited by examiner

HUMAN-MACHINE INTERFACE FOR A MOTOR VEHICLE AND METHOD FOR ASSEMBLING THE SAME

This application is a continuation of, and claims benefit under 35 U.S.C. §120 to PCT/FR10/00497, filed on Jul. 7, 2010, which claims priority to French Patent Application No. FR 0955086 filed in France on Jul. 21, 2009.

TECHNICAL FIELD OF THE INVENTION

The present invention relates to a human-machine interface for a motor vehicle and a method of manufacturing such a human-machine interface.

It is known practice to provide motor vehicles, in a central area of their dashboard, with a human-machine interface comprising a multifunction screen for displaying information, for example relating to a multimedia player or to a satellite positioning assistance system.

In some cases, this multifunction screen has a touch screen enabling it to be controlled by simple contacts with the screen.

Figure 1:
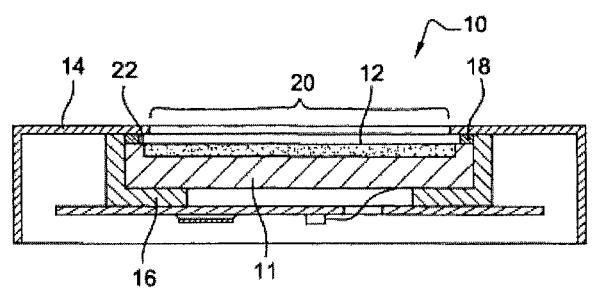

Referring to FIG. 1, this shows such a known human-machine interface 10 in cross section. Typically, this human-machine interface 10 comprises a TFT (thin film transistor) technology module 11, provided with a screen 12 intended to display information for the use of a user.

This TFT module 11 is placed in a housing, or cover, 14 ensuring the integration of all the elements of the human/machine interface 10 in a single block, notably by means of a support piece 16 and a gasket 18.

Manufacturing such a human-machine interface 10 in block form makes it possible to easily integrate the latter into the dashboard of a vehicle by simply inserting the block into a dedicated recess.

It should be noted that the housing 14 has an opening 20 corresponding to the outline 22 of the screen 12 in order to enable a user to view the information displayed by the screen 12.

Such human-machine interfaces present numerous drawbacks. A first drawback results from the outline 22 of the display screen 12, generally rectangular according to the standard form of a display screen, which limits the styles and/or the designs of dashboards that have to incorporate this imposed form.

A second drawback lies in the modular appearance of a dashboard comprising such a human-machine interface 10 for multifunction screen.

As a matter of fact, the latter is generally situated in a central area of the dashboard, in the vicinity of other human-machine interfaces such as an air-conditioning control panel and/or a radio central panel.

Consequently, the dashboard presents a set of human-machine interfaces which seem to be mutually independent, in their design and/or their implementation, which reduces the quality perceived by their user.

The present invention aims to resolve at least one of the abovementioned drawbacks. For this reason, it relates to a human-machine interface comprising a multifunction screen arranged in a housing intended to be housed in a dashboard of a vehicle, this housing having an opening corresponding to an outline of the screen in order to enable a user to view the information displayed on this screen, characterized in that the screen and the housing are covered by a common surface (40) forming a single front panel for the screen (32) and the housing (34).

Such an interface presents numerous advantages. Notably, it eliminates the modular perception of a dashboard incorporating this human-machine interface.

Furthermore, such a human-machine interface makes it possible to modify, totally or partly, the perception of the outline of the multifunction screen, which increases the possible styles and/or designs of the dashboards that have to incorporate an interface according to the invention.

As it happens, the shape of the outline perceived by a user of a human-machine interface according to the invention can be easily and simply adapted to a given style and/or design by adapting the appearance of the front panel covering the screen and its outline.

According to one embodiment, the common surface has a variable transparency such that the outline of the screen visible to a user of the human-machine interface is distinct from the outline of the screen.

In one embodiment, the variable transparency of the common surface is generated by a pigment of variable density and/or concentration on the common surface.

According to one embodiment, the human-machine interface comprises light sources, bordering the screen, intended to generate a light radiation that is practically identical to the light radiation generated by the screen.

In one embodiment, the light sources comprise light guides and/or prisms arranged so as to emit their light radiation in the same direction as the screen.

According to one embodiment, the light sources are maintained on an electronic card implemented for the operation of the screen.

In one embodiment, the light sources bordering the multifunction screen are linked to a light source of the screen.

In one embodiment, the human-machine interface is provided with a touch-sensitive surface.

In one embodiment, the common surface also covers at least one of the following elements: a control panel, a control, an indicator.

The invention also relates to a method of assembling a human-machine interface comprising a multifunction screen arranged in a housing intended to be housed in the dashboard of a vehicle, this housing having an opening corresponding to an outline of the screen in order to enable a user to view the information displayed on this screen, characterized in that, the interface comprising a common surface in accordance with one of the preceding embodiments, the human-machine interface is inserted into the dashboard as a single block.

In one embodiment, the interface comprising light sources bordering the screen, the light radiation generated by the screen is set to a wavelength and/or an intensity that is/are practically identical to the wavelength and/or the intensity of the light radiation generated by these light sources.

Figure 2:
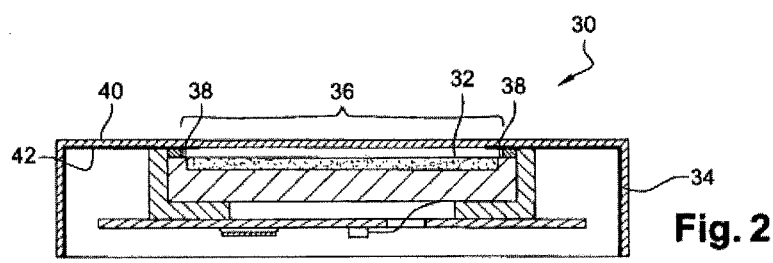
Figure 3:
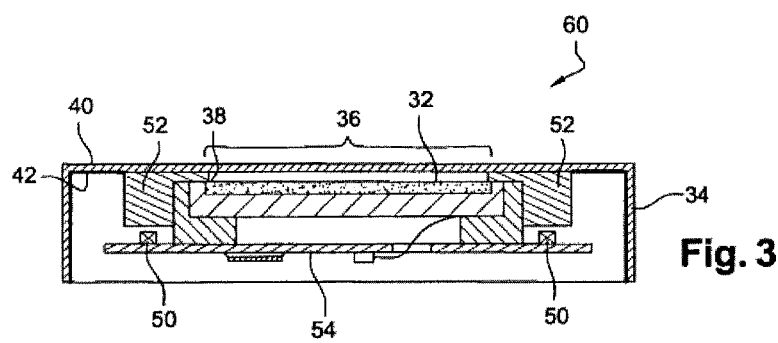
Figure 4:
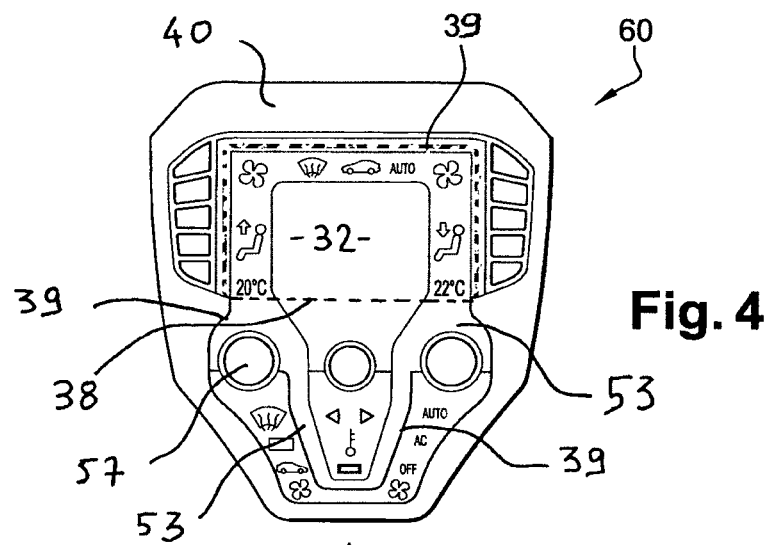
Figure 5:
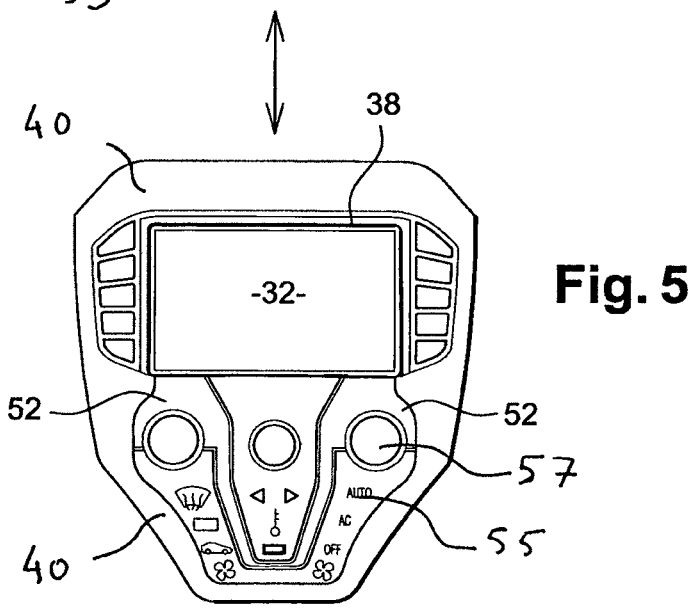

Other features and advantages of the invention will emerge clearly from the description given below, as an indication and in a nonlimiting way, with reference to the various appended figures which show:

in FIG. 1, already described, a cross-sectional view of a known human-machine interface provided with a multifunction screen, in FIGS. 2 and 3, cross-sectional views of human-machine interfaces according to the invention, in FIG. 4, a front view of a human-machine interface provided with a common surface according to the invention, and in FIG. 5, a front view of the human-machine interface of FIG. 5 without its common surface according to the invention.

DESCRIPTION OF THE PREFERRED EMBODIMENTS OF THE INVENTION

Those elements that are identical, by structure or by function, and appear in the different figures retain, unless otherwise specified, the same references. Referring to FIG. 2, a human-machine interface 30 comprises a multifunction screen 32 arranged in a housing 34 intended to be housed in the dashboard of a vehicle.

This housing 34 has an opening 36, corresponding to an outline 38 of the screen 32, in order to enable a user to view the information displayed on this screen 32.

According to the invention, the multifunction screen 32 and the housing 34 are covered by a common surface 40 so that the interface 30 presents a single front panel and appears to be formed by a single block as seen by its user.

Furthermore, this interface 30 has a variable transparency so that the outline of the screen perceived by a user of the human-machine interface 30 is distinct from the outline 38 of the screen.

This variable transparency can be obtained by a deposition or by an insertion of a material comprising a pigment 42 of variable density and/or concentration on the common surface, for example in order to obtain a degradation in the transparency of the common surface 40.

As an example, the common surface 40 may be formed by polycarbonate (PC) whereas the pigment may be deposited on this surface 40 by screen printing or by gluing a product—typically tapes—comprising this pigment 42.

By virtue of the use of this pigment 42, it is possible to totally or partially mask the outline 38 of the screen 32 so as to give this screen an apparent outline in accordance with the style and/or the design of the dashboard for which it is intended.

Furthermore, this tinted part can mask technical elements associated with the screen such as an electronic card or a socket.

Finally, it should be noted that the human-machine interface presents a smooth and even outer surface by virtue of this common surface.

However, such an embodiment generates a significant contrast between the common surface 40 provided with the pigment 42 and the screen 32, notably when the latter is activated and generates a light radiation unlike the pigment 42 which tends to absorb such a light radiation.

In order to make it possible notably to limit this contrast, in one embodiment of the invention, a human-machine interface 60 (FIG. 3) also comprises light sources 50 bordering the multifunction screen.

These light sources 50 are intended to emit a light radiation, practically identical to the light radiation generated by the multifunction screen, to a user of the human-machine interface.

To this end, when assembling the human-machine interface, for example in the dashboard, the light radiation generated by the screen is set to a wavelength and/or an intensity that is/are practically identical to the wavelength and/or the intensity of the light radiation generated by these light sources, generally diodes.

Moreover, the light sources 50 are associated with light guides 52 and/or with prisms arranged in such a way as to emit their light radiation in the same direction as the screen 32 so as to modify the outline of the screen perceived by a user of the human-machine interface.

As an example, FIG. 4 illustrates such a human-machine interface 60 which presents, to its user, an outline 39 of a multifunction screen 32 distinct from the real outline 38—represented by dotted lines in FIG. 4 and by continuous line in FIG. 5.

As it happens, as illustrated in this FIG. 5 in which this human-machine interface 60 is represented without its common surface 40 with variable transparency, it appears that the apparent form of the screen for a user is also modified, on the one hand, by the concealment of certain outlines of the rectangular screen 32 and, on the other hand, by light guides 52 which simulate an extension 53 of the surface of the screen.

As represented in FIG. 3, the light sources of these light guides 52 can be maintained on an electronic card 54 implemented for the operation of the screen.

In another variant, the light sources bordering the multifunction screen may be linked to a light source of the screen.

The present invention lends itself to numerous variants. Notably, the screen may be provided with a touch-sensitive surface so that the interface can be controlled by simple contacts.

Furthermore, as shown in FIG. 4, the common surface 40 may also cover a control panel, for example an air-conditioning control panel and/or a radio central panel, here comprising rotary knobs 57 and indicators 55.

The invention claimed is:

1. A human-machine interface comprising:
a single display device, wherein the single display device is a multifunction screen arranged in a housing configured to be placed in a dashboard of a motor vehicle, the housing having an opening corresponding to an outline of the screen to enable a user to view information displayed on the screen,
wherein the single display device and the housing are covered by a common surface forming a single front panel for the screen and the housing, and
wherein the common surface has a variable transparency such that an outline of the screen visible to the user of the human-machine interface is distinct from the outline of the screen.

2. The human-machine interface as claimed in claim 1, wherein the variable transparency of the common surface is generated by a pigment of at least one of a variable density and a variable concentration on the common surface.

3. The human-machine interface as claimed in claim 1, further comprising light sources bordering the screen for generating a light radiation that is practically identical to a light radiation generated by the screen.

4. The human-machine interface as claimed in claim 3, wherein the light sources comprise at least one of light guides and prisms arranged to emit light radiation in the same direction as the screen.

5. The human-machine interface as claimed in claim 3, wherein the light sources are maintained on an electronic card implemented for operation of the screen.

6. The human-machine interface as claimed in claim 3, wherein the light sources bordering the multifunction screen are linked to a light source of the screen.

7. The human-machine interface as claimed in claim 1, wherein the human-machine interface comprises a touch-sensitive surface.

8. The human-machine interface as claimed in claim 1, wherein the common surface also covers at least one selected from a group consisting of the following elements: a control panel, a control, and an indicator.

9. A method for assembling a human-machine interface comprising:
arranging a single display device wherein the single display device is a multifunction screen in a housing to be placed in a dashboard of a motor vehicle, the housing comprising an opening corresponding to an outline of the screen to enable a user to view information displayed on the screen, wherein the human-machine interface comprises a common surface forming a single front panel for both the screen and the housing, and wherein the common surface has a variable transparency such that an outline of the screen visible to the user of the human-machine interface is distinct from the outline of the screen inserting the human-machine interface into the dashboard of the motor vehicle as a single-block.

10. The assembly method as claimed in claim 9, wherein the human-machine interface further comprises light sources bordering the screen for generating a first light radiation, wherein a second light radiation of the screen is set to at least one of a wavelength and an intensity that is substantially identical to at least one of a wavelength and an intensity of the first light radiation generated by the light sources.

* * * * *